United States Patent

Csermak et al.

Patent Number: 5,563,467
Date of Patent: Oct. 8, 1996

[54] ELECTROMOTOR BRUSH HOLDERS USING A PUNCHED GRID

[75] Inventors: Martin Csermak; Bernd Walther, both of Bietigheim-Bissingen, Germany

[73] Assignee: ITT Automotive Europe GmbH, Germany

[21] Appl. No.: 381,942

[22] Filed: Feb. 13, 1995

[30] Foreign Application Priority Data

Aug. 11, 1992 [DE] Germany ............................ 42 26 553.3

[51] Int. Cl.⁶ .................................................... H01R 39/38
[52] U.S. Cl. ............................ 310/239; 310/242; 310/158
[58] Field of Search ..................................... 310/239, 242, 310/158

[56] References Cited

U.S. PATENT DOCUMENTS

| 4,896,067 | 1/1990 | Walther | 310/239 |
| 4,978,876 | 12/1990 | Koster | 310/239 |
| 5,280,210 | 1/1994 | Kress et al. | 30/158 |

FOREIGN PATENT DOCUMENTS 3629634 of 0000 Germany.

OTHER PUBLICATIONS

English Translation of International Preliminary Examination Report for Application PCT/EP93/01885, filed 17/Jul./93.

Primary Examiner—Steven L. Stephan
Assistant Examiner—Elvin G. Enad
Attorney, Agent, or Firm—J. Gordon Lewis; Thomas N. Twomey

[57] ABSTRACT

A brush holder for a commutator electromotor comprises a backing plate of an electrically insulating, injection-moulded plastic material on which are located accommodating means for electric components, and further comprises two oppositely arranged cases for carbon brushes. To ensure the mounting of the brush holder in a fully automated way, each case is formed of a U-shaped carbon brush guide provided in the backing plate and of an area of a punched grid covering the carbon brush guide, which grid is provided with a closure tang for each case.

9 Claims, 4 Drawing Sheets

ELECTROMOTOR BRUSH HOLDERS USING A PUNCHED GRID

TECHNICAL FIELD

The present invention relates to brush holders for electromotors provided with a commutator.

BACKGROUND OF THE INVENTION

In a brush holder of this type as taught by DE 36 29 634 C2 the cases for the carbon brushes in conformity with the block shape thereof are integrally bent from a metal sheet and are fixed to a backing plate. A connecting cable is respectively led from the carbon brushes to one of the electric components held on the backing plate. This type of construction and arrangement of the cases for the carbon brushes and of the connection of the carbon brushes to the electric components is relatively time-consuming and, in particular, does not permit an automated manufacture of a brush holder of this type.

It is, therefore, the object of the present invention to provide a brush holder for electromotors provided with a commutator.

In view of the measures suggested by the invention it is possible for the backing plate of plastic material to be provided with a means for accommodating the carbon brushes open from the top and at the same time forming a guide with no need of taking any additional measures. This solution is attainable without resorting to any complex tools as the open design eliminates the use of tool slides or the like. This carbon brush guide and accommodating unit, is then covered in a simple way by the punched grid thereby forming the complete case(s) without requiring any special manual operations of assembly to be performed.

The brush holder of the present invention can be completed in one single operation.

Due to the features of the present invention the respective end of the connecting cable already connected to the carbon brush can be connected, as, by soldering, to the lug as provided during the automated introduction of the carbon brush into the case.

This lug according to the present invention is an integral part of the punched grid and, through simple bending operations, is placed in a corresponding position for easy assembly.

A measure favoring the fully automated assembly is conveyed by the present invention since the introduction of the carbon brushes causes the connecting cables thereof to be guided in the longitudinal slot, thereby preventing, on the one hand, the carbon brush from dropping toward the other side after bending the closure tang and after inserting a compression spring and, on the other hand, insuring the passage of the respective end of the connecting cable to the afore-mentioned lug.

The features of the present invention safeguard a fully automated connection of the electric components.

In the event that, for example, a throttle is to be used as a suppressor element it will be readily possible to provide between the two lugs a separating point for the throttle, for example, by punching or the like.

A simple and firm connection between backing plate and punched grid is performed in a fully automated way.

DETAILED DESCRIPTION OF THE PREFERRED EMBODIMENTS

Figure 1:
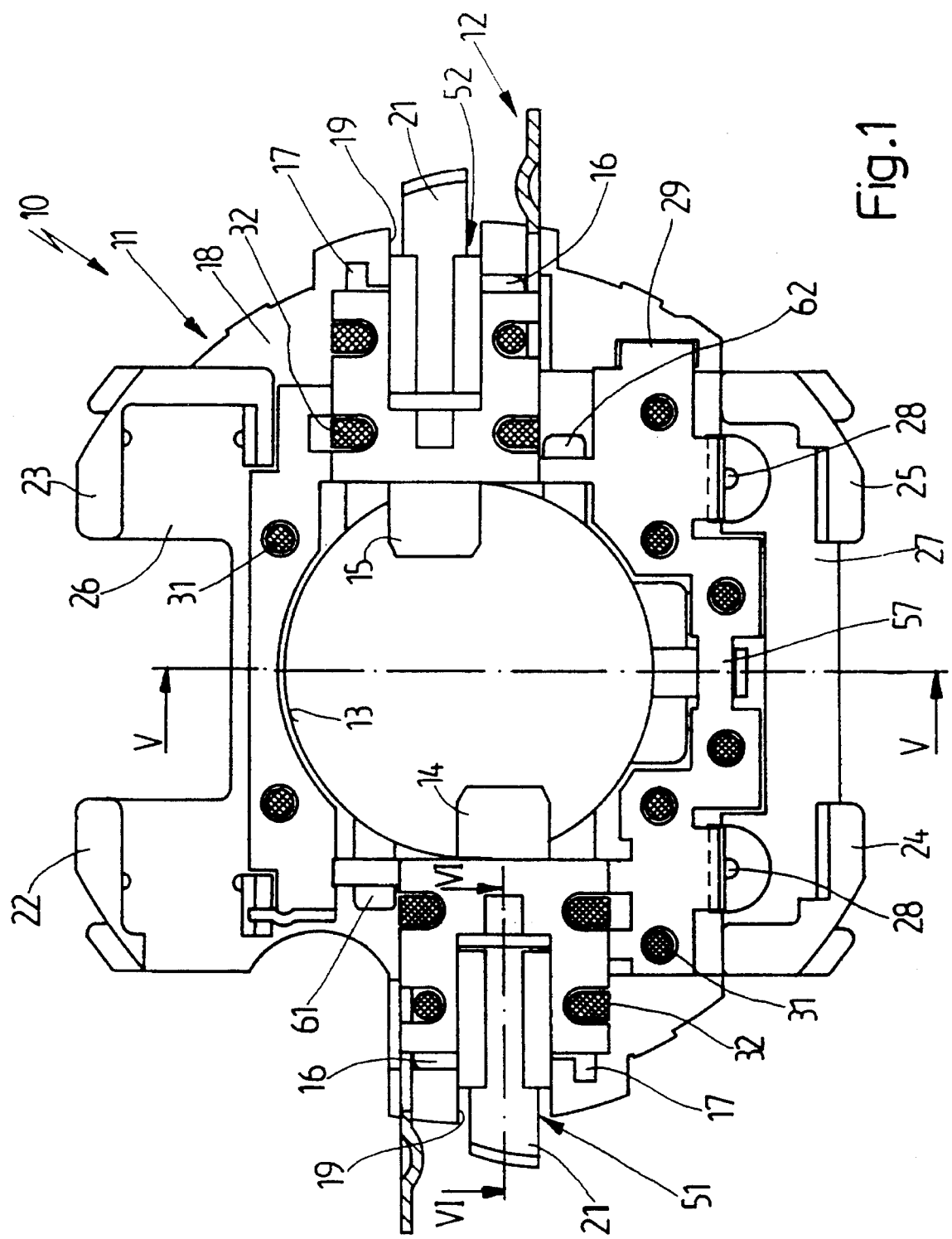
FIG. 1 is a plan view of a brush holder for electromotors provided with a commutator in accordance with a preferred form of embodiment of the present invention, with no electric components being shown.

The brush holder 10 as shown in the drawing is intended to be mounted on an electromotor provided with a commutator. The brush holder 10 substantially consists of a backing plate 11 made of an electrically insulating material and preferably being injection-moulded from a plastic material, and of a punched grid 12 of an electrically conducting material, preferably from a metal. The punched grid 12 is fixed to the backing plate 11 through caulking. The brush holder 10 is provided with electric components (not shown), such as thermoswitches or suppressor elements, for example, in the form of one or several coils, that are held in accommodating means provided on the backing plate 11.

A planar disk 18 forms an integral part of the backing plate 11 of the brushholder 10 and is provided with a number of openings, with a variety of lugs vertically protruding from the surfaces of the disk on both sides thereof. The backing plate 11 integrally injection-moulded from plastic material is provided with a central circular recess 13 in which is contained the commutator of the motor armature with the electromotor being in assembled condition. The backing plate 11, on two opposing points staggered over the transverse axis concerned, in each case is provided with two parallel guiding webs 16 and 17 projecting from the basic face thereof, which serve as a guide and form part of the cases 51,52 for the carbon brushes 14 and 15 to be introduced into (see FIG. 6). The dimensions of the two guiding webs 16 and 17 are such that together with the surface of the backing plate 11 they form a U-shaped guide the depth and width of which conform to the corresponding cross-sectional dimensions of the carbon brush 14,15.

The disk 18 of the backing plate 11 in the area between the two guide webs 16 and 17 in each case is provided with a slot-type recess 19 in which is contained an unlocking spring 21 the one end of which is moulded to the bottom side of the disk 18 in the area of the central recess 13 and the other free end of which slightly protrudes beyond the outer circumference of the backing plate 11. The backing plate 11 includes upwardly protruding lugs 22 and 23; 24 and 25, respectively. These pairs of lugs are staggered by approximately 90° over the respective pairs of guide webs 16 and 17 and in each case form accommodating means 26 and 27, respectively of the plug-in type, open from the top and intended to accommodate, for example, a thermoswitch and a suppressor throttle, respectively.

In the area of the plug-in accommodating means 27, the disk 18 of the backing plate 11 is provided with two passage bores 28. Another rectangular passage recess 29 provided in the disk 18 and in the lug thereof, respectively, downwardly moulded thereto is contained in an area between the one lug 25 of the plug-in accommodating means 27 and the opposite guiding web 17 of the case 52 for the one carbon brush 15.

The backing plate 11, moreover, in various areas of the disk 18 includes circular lugs or mouldings protruding from the surface of the disk and formed as caulking lugs 31 as well as guiding lugs 32 on the outer faces of the guiding webs 16 and 17 which, in part, also serve for caulking the backing plate 11 with the punched grid 12 bent to shape.

Figure 2:
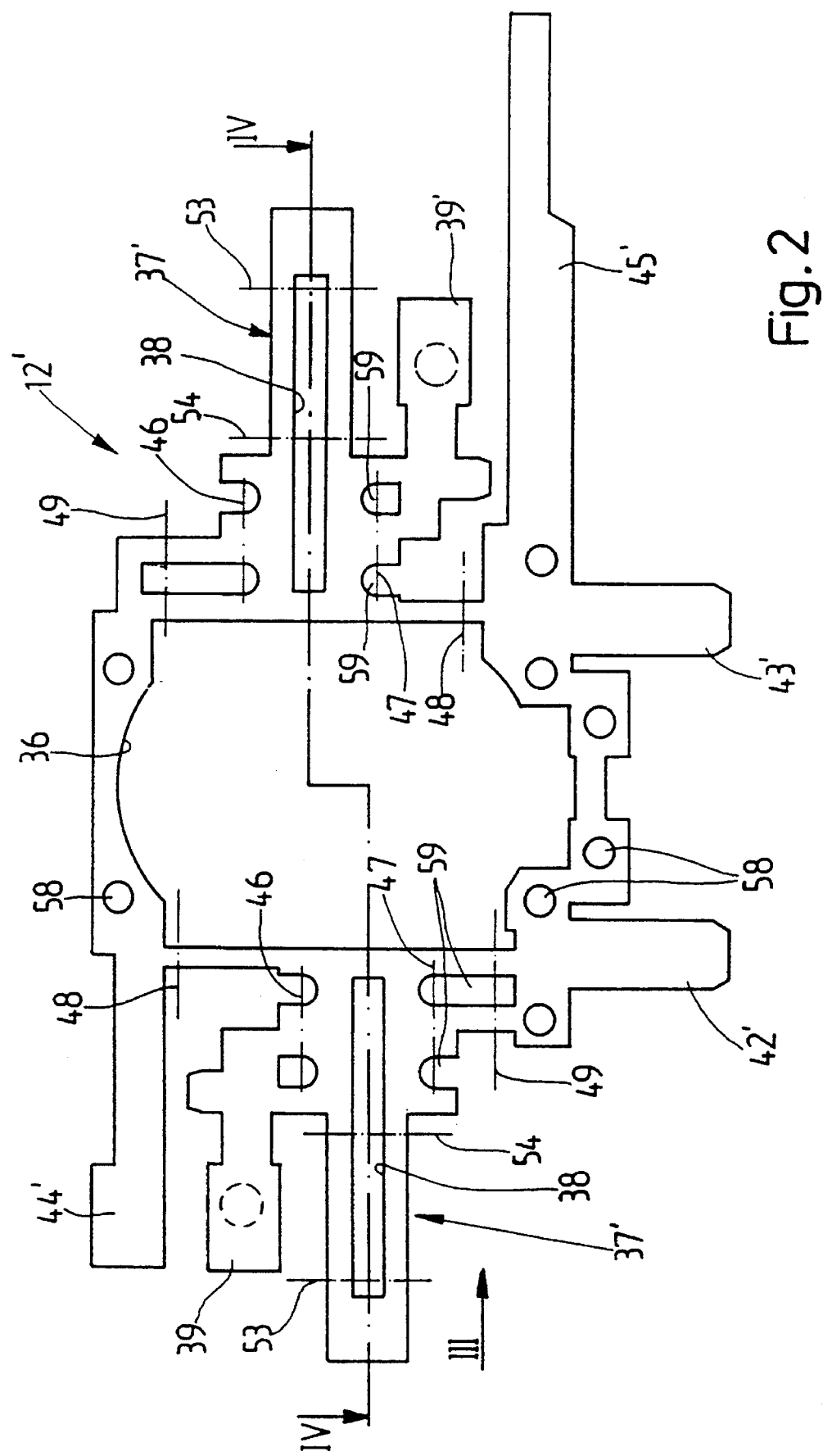
FIG. 2 is a plan view of a punched grid as used in the brush holder according to FIG. 1 showing the planar initial state.
Figure 3:
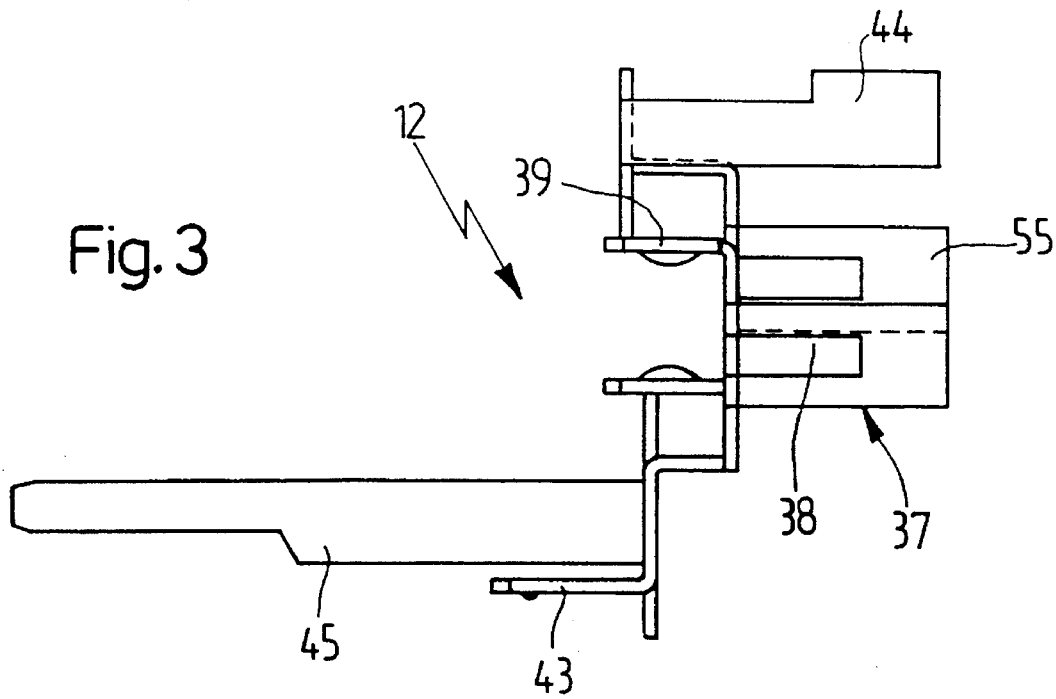
FIG. 3 is a side view in the direction of arrow III of FIG. 2 showing a bent condition suitable for assembly on a backing plate.
Figure 4:
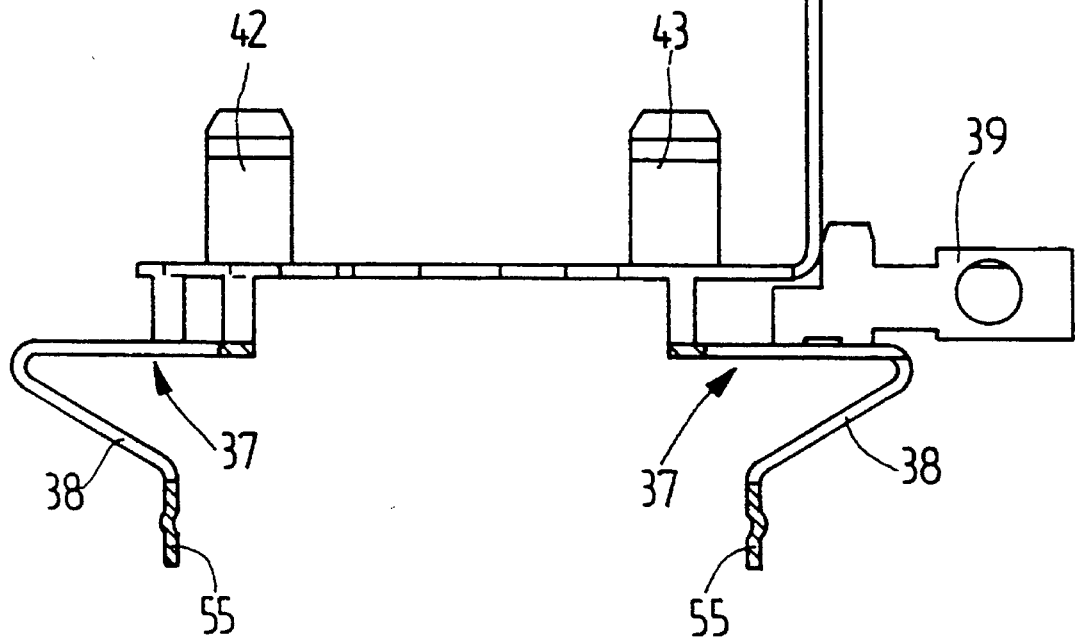
FIG. 4 is a sectional view along the line IV—IV of FIG. 2—but also in the condition as shown in FIG. 3.
Figure 5:
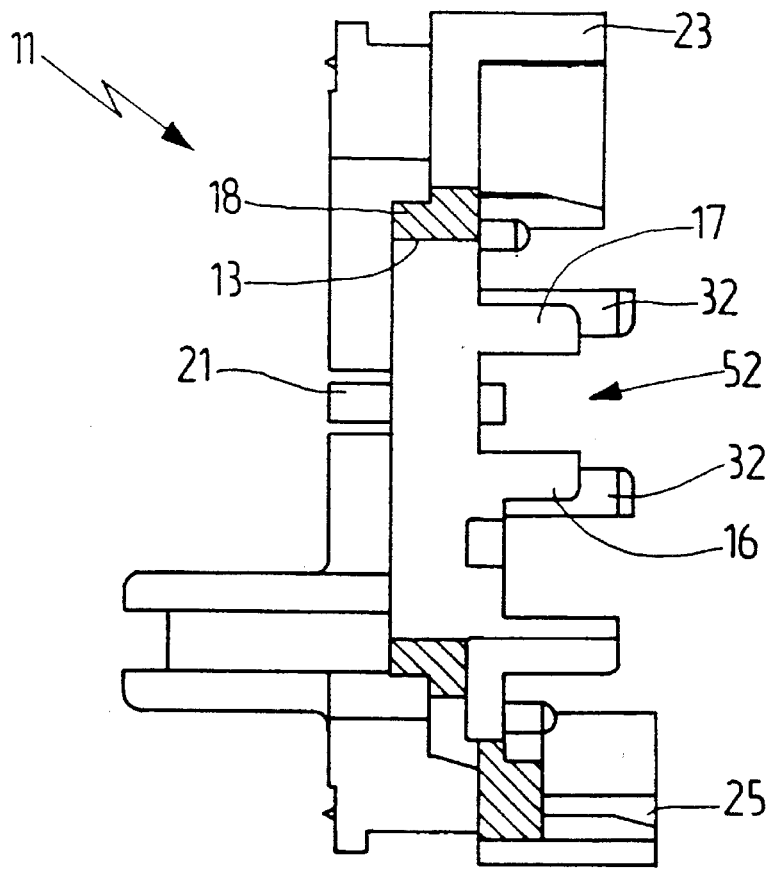
FIG. 5 is a sectional view along the line V—V of FIG. 1 of the backing plate alone.

According to FIG. 2, the punched grid blank 12' is punched from a planar metal sheeting in a single operation. The punched grid 12 is then bent from the blank 12' into a shape as shown in FIGS. 3 and 4 thereby enabling the punched grid 12 to be connected to and caulked with the backing plate 11. The punched grid blank 12' according to FIG. 2 is provided with a central recess 36 which, in opposite internal areas, in part, is of a circular configuration conforming to the central recess 13 provided in the backing plate 11.

Figure 6:
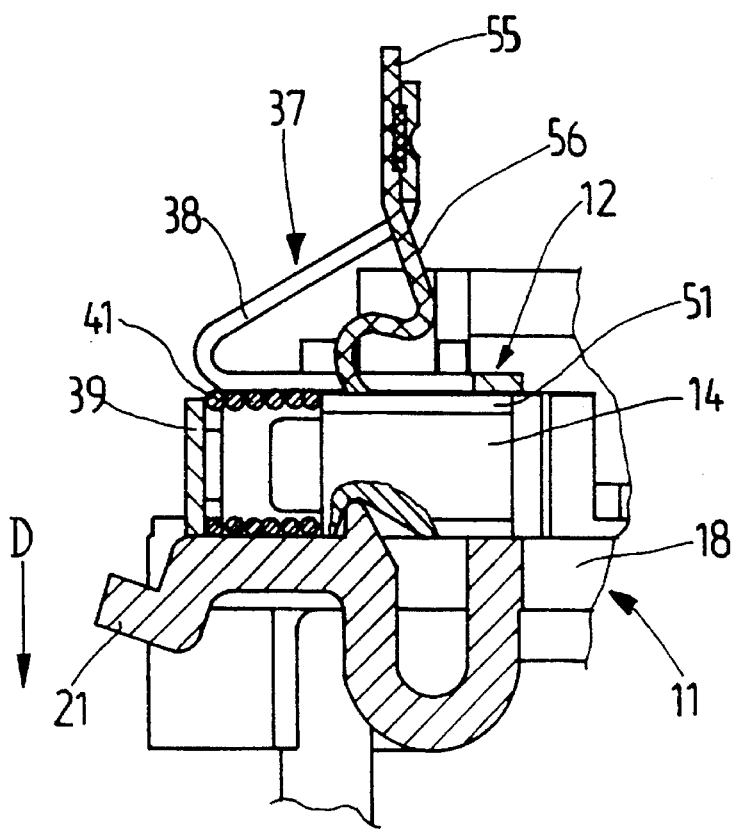
FIG. 6 is a sectional view along the line VI—VI of FIG. 1, i.e. in the assembled condition of the brush holder.

Provided diametrically opposite to one another and in staggered relationship vis-à-vis an axis are tangs 37' which form an area 37 yet to be described which provides a cover for the U-shaped guiding web 16,17 for the carbon brush and, hence, for the case 51,52. The tang 37' is provided with a longitudinal slot 38 the ends of which are respectively in spaced relationship from the inner confinement of the central recess and from the free ends of the tang 37', respectively. Provided in parallel to each of the tangs 37' is another tang 39' which, in assembled condition, forms the closure tang 39 for the carbon brush 14 between which two parts a compression spring 41 is provided as shown by FIG. 6. Staggered by about 90° over the tangs 37' and 39' in spaced relationship with respect to one another are provided parallel webs 42' and 43' which, in assembled condition form lugs 42 and 43 intended to be used, for example, for a suppressor throttle. Additional webs 44' and 45' are arranged in parallel to the tangs 39', which webs form lugs 44 and 45, respectively, for the thermoswitch (not shown) and a voltage pole, respectively.

In accordance with FIG. 2, on the one hand, and FIGS. 3 and 4, on the other, the punched grid blank 12' is bent downwardly along the lines 46 and 47 extending in parallel to the tangs 37' and is bent again in the opposite direction along the lines 48 and 49 resulting in the cover range 37 above the guide webs 16 and 17 of the U-shaped carbon brush guide, thereby forming the cases 51 and 52, respectively, for accommodating the carbon brush 14,15 concerned. Along the transverse lines 53 and 54, the tang 37' is twice bent in a direction transverse to the longitudinal extension thereof, thereby forming a lug 55 for a carbon cable 56 (see FIG. 6) connected to the carbon brush 14 and 15, respectively. Due to this bending of the tang 37' along the line 54, the longitudinal slot 38 is open from the side facing away from the central recess 13 and 36 so that during insertion of the carbon brush 14 and 15, respectively, into the case 51 and 52, respectively, the carbon cable 56 thereof is accommodated in the longitudinal slot 38 and can be mechanically connected, as by soldering, to the end of the lug 55 (see FIG. 6). It is only in this condition that the compression spring 41 is mounted to the rear end of the carbon brush 14 and is held by bending the closure tang 39.

It is understood that also the webs 42', 43'44' and 45' are bent downwardly or upwardly along predetermined lines before the punched grid 12 is mounted into or onto the backing plate 11. It is only web 44' that is bent upwardly in order that the end thereof be at the thermoswitch connection level. The other webs 42', 43' and 45' are plugged through the corresponding recesses 28 and 29 provided in the backing plate 11. If the lugs 42 and 43 are connected to a suppressor throttle, the area of connection between the lugs, for example, at point 57 (see FIG. 1) is interrupted by a punching operation which can be effected during caulking the punched grid 12 with the backing plate 11.

For caulking the punched grid 12 with the backing plate 11 the punched grid 12 is provided with a plurality of circular and elongated recesses 58 and 59, respectively, through which are forced the caulking lugs 31 and the guiding lugs 32, respectively when the punched grid 12 is mounted on the backing plate 11. Caulking the two components together is effected in such a way that, with the punched grid 12 mounted, at least the caulking lugs 31 are deformed on the ends protruding beyond the punched grid 12. The punched grid 12, when mounted onto the backing plate 11, is additionally separated at other points 61 and 62 to attain a corresponding electric circuit configuration and line connection, respectively (see FIG. 1).

FIG. 6, moreover, conveys that the unlocking spring 21 serves to hold the carbon brush 14 and 15, respectively in the retracted condition during introduction of the commutator of the electromotor into the central recess 13 and 36, respectively. Subsequently, the carbon brush 14 and 15 can be transported by the compression spring 41 within the case 51 and 52, respectively, to the circumference of the commutator by applying pressure to the unlocking spring 21 in the direction of the arrow D.

We claim:

1. A brush holder for commutator electromotors, comprising:

a backing plate of an electrically insulating material;

a punched grid of an electrically conducting material, the punched grid covering the backing plate and being adapted to be assembled therewith;

two opposing cases for carbon brushes, each of the cases being arranged between the backing plate and the punched grid and being formed of a closure tang provided in the punched grid, of a pair of lugs constituting a substantially U-shaped carbon brush guide and provided in the backing plate, and of an area of the punched grid covering the carbon brush guide;

pressure receiving means arranged at the backing plate for receiving the punched grid in the course of the assembling; and caulking means arranged at the punched grid and having a caulking surface opposed to the pressure receiving means, to thereby secure completion of the holder in a single operation.

2. The brush holder according to claim 1, wherein a single punched grid is mounted on the backing plate for the two cases and is provided with corresponding electric separating points.

3. The brush holder according to claim 1, wherein the area of the punched grid covering the carbon brush guide is provided with a lug for a carbon brush cable.

4. The brush holder according to claim 3, wherein the lug for the carbon brush cable is formed of an upwardly bent extension of the area of the punched grid covering the carbon brush guide.

5. The brush holder according to claim 3, wherein the area of the punched grid covering the carbon brush guide and the lug for the carbon brush cable is provided with a longitudinal slot for the carbon brush cable.

6. The brush holder according to claim 1, wherein the pressure receiving means include lugs protruding from the backing plate.

7. The brush holder according to claim 1, wherein the caulking means include recesses made in the punched grid.

8. The brush holder according to claim 1, wherein the backing plate is provided with means for accommodating electric components and the punched grid is provided with lugs for retaining the electric components at the accommodating means, said accommodating means include lugs staggered by approximately 90° over the respective pairs of said lugs constituting substantially U-shaped carbon brush guides.

9. The brush holder according to claim 8, wherein a zone of connection between the lugs is made punched.

* * * * *